United States Patent Office 3,104,948
Patented Sept. 24, 1963

3,104,948
REMOVAL OF IMPURITIES FROM CAUSTIC
SODA SOLUTIONS
Bob R. Harrell, deceased, late of Lake Jackson, Tex., by Shirley S. Harrell, widow, Lake Jackson, Tex., assignor to The Dow Chemical Company, Midland, Mich., a corporation of Delaware
No Drawing. Filed Apr. 19, 1962, Ser. No. 189,253
6 Claims. (Cl. 23—184)

This invention relates to a process for purifying aqueous caustic soda solutions, and more particularly, to an improved method of removing metallic compounds from an aqueous solution of caustic soda where they are present therein as impurities.

It is known that commercial aqueous solutions of caustic soda unless specially treated, are contaminated with from twenty to over a hundred parts of metallic impurities per million parts of sodium hydroxide on a dry basis. The presence of these metallic impurities renders the liquid caustic soda undesirable or unacceptable for many modern uses. Numerous methods have been disclosed for the removal of such impurities as iron where a compound is added to the caustic solution to effect such removal. Many materials, such as certain salts of magnesium, barium, and strontium have been disclosed as effective for the removal of particular impurities, generally iron compounds, from caustic soda solutions. Through commercial experience with these treating agents, however, it has been found that they cause little or no reduction in the concentration of some metallic impurities such as compounds of calcium and aluminum. Many of the known methods of treatment will remove the iron impurity but the treating compound added will itself contaminate the caustic with metallic residues which are difficult to remove by ordinary methods. This is the case with the use of treating compounds such as strontium and magnesium sulphate in particular. The magnesium oxide and magnesium hydroxide treating agents heretofore proposed leave less metal residue from the treating agent in the finished product but they are generally used specifically for iron removal. None of the heretofore known methods of purification based upon the use of known treating agents, or any combination of them, have been found adequate in removal of a substantial proportion of all the metallic impurities usually present in the caustic soda during its manufacture.

Generally speaking, the effectiveness of a compound in the removal of metallic impurities from caustic soda solutions cannot be predicted. Many compounds of similar structure to known iron removal agents are ineffective. Such compounds as magnesium carbonate, magnesium chloride hexahydrate, alumina and magnesium hydroxide are in this category.

The principal object of this invention is to provide an improved method of removing metallic impurities from a caustic solution whereby a substantial proportion of the metallic impurities, such as compounds of aluminum, calcium, iron, and magnesium, dissolved therein during its manufacture are removed. A further object is to provide an improved process for removing metallic impurities from caustic soda solutions wherein substantially no metallic residue of the treating agent remains in the finished product. A still further object of this invention is to provide a method of reducing the metallic impurities in a solution of caustic soda to a lower level than has been previously obtained. Other objects and advantages will become apparent as the description of the invention proceeds.

The invention is predicated upon the discovery that by admixing finely divided "high activity" magnesium fluoride powder at a temperature of from 0 degree to 50 degrees C. with the caustic soda solution to be purified and separating the resulting solution from the resulting suspended matter, the metallic impurities in the so treated solution are reduced to a surprisingly low level. It has also been discovered that by treating the caustic soda solution with "high activity" magnesium fluoride removal of compounds of such metals as calcium, aluminum, and magnesium is effected. No process has been commercially available heretofore for the removal of these metallic impurities in addition to the iron compounds. At temperatures below 0 degree C., the effectiveness of this magnesium fluoride treatment to remove impurities becomes impaired and the more concentrated caustic solutions become difficult to handle. At temperatures in excess of 50 degrees C., the product caustic soda tends to become cloudy and the effectiveness of the magnesium fluoride, particularly as to the removal of iron compounds, is impaired. It is preferred to use a treating temperature of from 0 degree to 30 degrees C.

The term "high activity" magnesium fluoride as used herein means magnesium fluoride which is produced by the reaction of $MgCl_2$ and $CaF_2$ in a dilute water solution at a temperature of between 200 degrees and 270 degrees C. and a pressure sufficient to maintain the solution in the liquid phase. The insoluble $MgF_2$ crystals thus produced are separated from the resulting solution and may be employed in the process of this invention either wet or dry. The crystals thus produced are elongated or cigar shaped and exhibit an unusually high activity as regards the removal of impurities such as iron compounds as well as possessing a unique ability to remove such metallic impurities as compounds of calcium and aluminum. The preferred process for the production of high activity magnesium fluoride involves the reaction of $MgCl_2$ with $CaF_2$ in dilute aqueous solution wherein the magnesium chloride is in a concentration of from about 10 to 30 wt. percent of the solution, the temperature is from about 230 to 270 degrees C., and the reaction pressure is from about 450 to 800 p.s.i. This process is described in detail in U.S. Patent No. 2,985,508. Magnesium fluoride prepared by the above described process agglomerates after intermixing with the caustic soda solution to be purified, allowing rapid and complete filtration, thereby preventing contamination of the finished caustic soda solution with the treating agent.

Commercial magnesium fluoride is prepared by first reacting magnesium hydroxide and HF in an aqueous solution to produce $MgF_2$ and water. The product is then separated from the solution, calcined at high temperatures, and ground to the desired particle size. This process produces a particle of a generally round shape which shows some capacity for removal of iron and magnesium impurities from concentrated caustic soda solutions but will not remove compounds of aluminum or calcium. The ability of commercial magnesium fluoride to remove iron and magnesium compounds is, however, very limited and much inferior to high activity magnesium fluoride employed in this invention.

In commercial practice, treatment to remove metallic impurities to a low level, in accordance with the invention, is preferably applied to the more concentrated caustic soda solutions such as those containing from about 40 to 70 weight percent NaOH, although the method may be employed on caustic soda solutions of substantially any concentration, as for example, aqueous solutions containing from 8 to 70 weight percent of caustic soda.

In carrying out the invention, the treating agent of the finely divided "high activity" magnesium fluoride, that is magnesium fluoride prepared as described hereinbefore, may be added directly to the caustic soda solution or it may be preslurried prior to mixing. It has been found preferable to form a slurry of from 7 to 15 percent by weight of the treating agent in water or in an aqueous caustic solution containing up to 20 percent NaOH. If the treating agent is fed as a dry powder, the particle size should be such that at least 90 percent passes through the 270 size sieve. While substantially any particle size, within convenient limits, of high activity magnesium fluoride may be employed as the treating agent to remove metallic impurities from caustic soda solutions, in accordance with the invention it is preferred to employ crystals of from 0.5 to 2.0 microns in size. If a larger particle size is employed, it is necessary to increase the amount of high activity magnesium fluoride added to the caustic soda solution for any given amount of impurities. If a smaller particle size is used, a more careful filtration must be used in order to properly remove the treating agent from the caustic soda solution after treatment has been effected.

Time required for the treatment is not critical and may vary over a wide range depending upon the concentration of metallic impurities to be removed from the caustic soda solution, the quantity of the high activity magnesium fluoride added, the temperature of the solution, and the method of addition employed, e.g., whether as a dry powder or a slurry. In the absence of unusually high impurity concentration, however, a treatment time of from 0.5 to 24 hours is sufficient with from 3 to 15 hours being generally preferred at temperatures of 0 to 30 degrees C. A shorter treatment time may be used under conditions of low impurity level in the caustic solution with the employment of a large amount of the treating agent. The amount of high activity magnesium fluoride that is preferably added to the caustic solution will vary according to the quantity of the metallic impurities present in the caustic solution treated. More magnesium fluoride is required for the solutions containing a higher concentration of impurities. For caustic solutions usually obtained in commercial operations, from 1 to 10 lbs. of high activity magnesium fluoride per ton of anhydrous sodium hydroxide is generally used. For caustic soda solutions containing up to around 120 parts of impurities, calculated as metal, per million parts of caustic soda on a dry basis, from 2 to 5 lbs. of high activity magnesium fluoride per ton of anhydrous caustic soda are generally preferred.

When the high activity magnesium fluoride treating agent is added to the caustic soda solution, the mixture is agitated to obtain good contact between the treating agent and the solution. The agitation time is not critical but should be sufficient to completely intermix the treating agent with the solution. It is preferred, however, to agitate the mixture throughout the entire treatment time.

The separation of the spent treating agent from the caustic soda solution after treatment may be effected by various methods such as settling, centrifugation, filtering, and the like. Filtration is the preferred method from a practical standpoint.

The following example is illustrative of the practice of the invention.

EXAMPLE 1

A high activity magnesium fluoride was prepared by adding 200 mesh $CaF_2$ to a 22 weight percent slurry of magnesium chloride in water so as to obtain a 20 weight percent stoichiometric excess of $MgCl_2$, based upon the equation $MgCl_2 + CaF_2 = MgF_2 + CaCl_2$. This mixture was agitated for 20 minutes at 250 degrees C. and 600 p.s.i.g. At the end of this period, the reaction mass was cooled and the high activity magnesium fluoride therein was separated by elutriation and filtration, and then dried. The high activity magnesium fluoride thus prepared, having a particle size of approximately 270 mesh, was then mixed with an aqueous solution of 10 weight percent caustic soda to form a slurry containing 10 weight percent of magnesium fluoride.

To a nickel flask containing 1600 grams of a 50 weight percent untreated aqueous caustic solution at 10° C. containing 8 p.p.m. Al, 24 p.p.m. Ca, 60 p.p.m. Fe, and 23 p.p.m. magnesium as compounds was added the above described magnesium fluoride slurry in an amount such that the high activity magnesium fluoride was present in a concentration equal to 3 lbs. of magnesium fluoride per ton of anhydrous caustic soda in solution. The mixture was agitated for a period of 6 hours. At the end of this time, the reaction mass was filtered, and the filtrate was analyzed for residual metallic impurities. As blanks for comparison, three similar tests were made in a similar manner, one using commercial magnesium fluoride, another magnesium oxide, and another strontium sulfate as the treating agent in the place of high activity magnesium fluoride. The results obtained, the concentration of the impurities in the untreated caustic soda solution used in the tests, and pertinent data are given in the table below:

*Impurities in Parts Per Million Remaining After Treatment of 50 Percent Caustic Soda Solution*

TREATING AGENT [1]

| Impurity, p.p.m. | None | Ex. $MgF_2$, High Activity | Blank 1, Commercial $MgF_2$ | Blank 2, Magnesium Oxide | Blank 3, Strontium Sulfate |
|---|---|---|---|---|---|
| Al | 8 | 4.5 | 8 | 8 | 8 |
| Ca | 24 | 1.0 | 24 | 19 | 24 |
| Fe | 60 | 1.0 | 10 | 5 | 5 |
| Mg | 23 | 4.0 | 16 | 12 | 10 |
| Sr | 10 | 10.0 | 10 | 10 | 160 |

[1] 3 lbs. of treating agent per ton of NaOH in the solution.

This application is a continuation-in-part of copending application Serial No. 705,735, filed December 30, 1957, now abandoned.

What is claimed is:

1. A process for purifying an aqueous concentrated caustic soda solution which comprises:
   (A) Mixing a finely divided high activity magnesium fluoride, prepared by
      (a) reacting $MgCl_2$ with $CaF_2$ in an aqueous medium at a temperature in the range of 200 to 270 degrees C. and a pressure sufficient to maintain the aqueous medium in the liquid phase, and
      (b) separating the $MgF_2$ crystals thus produced, with the caustic soda solution at a temperature in the range of 0 to 50 degrees C. and thereafter
   (B) separating the so purified caustic soda solution from the resulting mixture.

2. A process for purifying an aqueous concentrated caustic soda solution which comprises:
   (A) mixing a finely divided high activity magnesium fluoride, prepared by
      (a) reacting $MgCl_2$ with $CaF_2$ in an aqueous medium at a temperature in the range of 200 degrees to 270 degrees C. and a pressure sufficient to maintain the aqueous medium in the liquid phase and
      (b) separating the $MgF_2$ crystals thus produced, with the caustic soda solution at a temperature in the range of 0 degree to 30 degrees C., for from 0.5 to 24 hours, and thereafter
   (B) filtering the resulting mixture.

3. A process for removing metallic impurities selected from the group consisting of aluminum, calcium, iron and magnesium from an aqueous caustic soda solution containing from 8 to 70 weight percent of sodium hydroxide which comprises:
   (A) adding a finely divided high activity magnesium fluoride, prepared by
      (a) reacting $CaF_2$ with an aqueous solution of 10–30 weight percent $MgCl_2$ at a temperature of from 230–270 degrees C. and a pressure of from 450 to 800 p.s.i. and
      (b) separating the $MgF_2$ crystals thus produced, in proportions of 1 to 10 lbs. of the high activity magnesium fluoride per ton of anhydrous caustic soda present in the caustic soda solution, (B) agitating the resulting mixture for from 3 to 15 hours at a temperature of 0 to 50 degrees C., and thereafter (C) separating purified caustic soda solution from the resulting mixture.

4. A process for removing metallic impurities selected from the group consisting of aluminum, calcium, iron and magnesium from an aqueous concentrated caustic solution which comprises:

(A) adding a slurry containing from 7 to 15 weight percent of a high activity magnesium fluoride having a particle size of from 0.5 to 2 microns in a 20 percent sodium hydroxide solution, said magnesium fluoride having been prepared by (a) reacting $MgCl_2$ with $CaF_2$ in an aqueous medium at a temperature in the range of 230 to 270 degrees C. and a pressure of from 450 to 800 p.s.i. and (b) separating the $MgF_2$ crystals thus produced, to the concentrated caustic soda solution in proportions of from 1 to 10 lbs. of the high activity magnesium fluoride per ton of anhydrous caustic soda present in solution, and (B) agitating the mixture for from 0.5 to 24 hours at a temperature in the range of 0 to 50 degrees C., and thereafter (C) separating the purified caustic soda solution from the resulting mixture.

5. A process for removing metallic impurities selected from the group consisting of aluminum, calcium, iron and magnesium from an aqueous caustic soda solution containing from 8 to 70 weight percent sodium hydroxide and having up to 120 parts by weight of metallic impurities per million parts of anhydrous sodium hydroxide which comprises:

(A) adding a slurry containing from 7 to 15 weight percent of high activity magnesium fluoride in an aqueous caustic solution containing less than 20 weight percent sodium hydroxide to the aqueous caustic soda solution to be treated in proportions of 3 to 5 lbs. of high activity magnesium fluoride per ton of anhydrous caustic soda present in the solution to be treated, said magnesium fluoride prepared by (a) reacting $MgCl_2$ with $CaF_2$ in an aqueous medium at a temperature in the range of 230 to 270 degrees C. and a pressure of from 450 to 800 p.s.i. and thereafter (b) separating the $MgF_2$ crystals thus produced, (B) agitating the resulting mixture for from 3 to 15 hours at a temperature in the range of 0 to 30° C., and (C) filtering the resulting mixture to obtain a caustic soda solution having a substantial portion of the impurities removed therefrom.

6. A process for removing metallic impurities from an aqueous caustic soda solution containing from 8 to 70 percent of NaOH by weight and from 10 to 120 parts of metallic impurities selected from the group consisting of aluminum, calcium, iron and magnesium per million parts by weight of caustic soda which comprises:

(A) adding to the caustic soda solution to be treated 3 lbs. of high activity magnesium fluoride, prepared by (a) reacting $MgCl_2$ with $CaF_2$ in an aqueous medium at a temperature of 230 to 270 degrees C. and a pressure of from 450 to 800 p.s.i. and (b) separating the $MgF_2$ crystals, having an average particle size of from 0.5 to 2 microns, thus produced, per ton of anhydrous caustic soda present in the solution at a temperature of 10 degrees C., (B) agitating the mixture for 6 hours, and (C) filtering the resulting caustic soda solution.

References Cited in the file of this patent
UNITED STATES PATENTS 2,985,508    Fredrickson et al. _____ May 23, 1961